(No Model.)
R. E. STRAIT.
WIND ENGINE.
2 Sheets—Sheet 2.
No. 259,241.　　　　　　　Patented June 6, 1882.
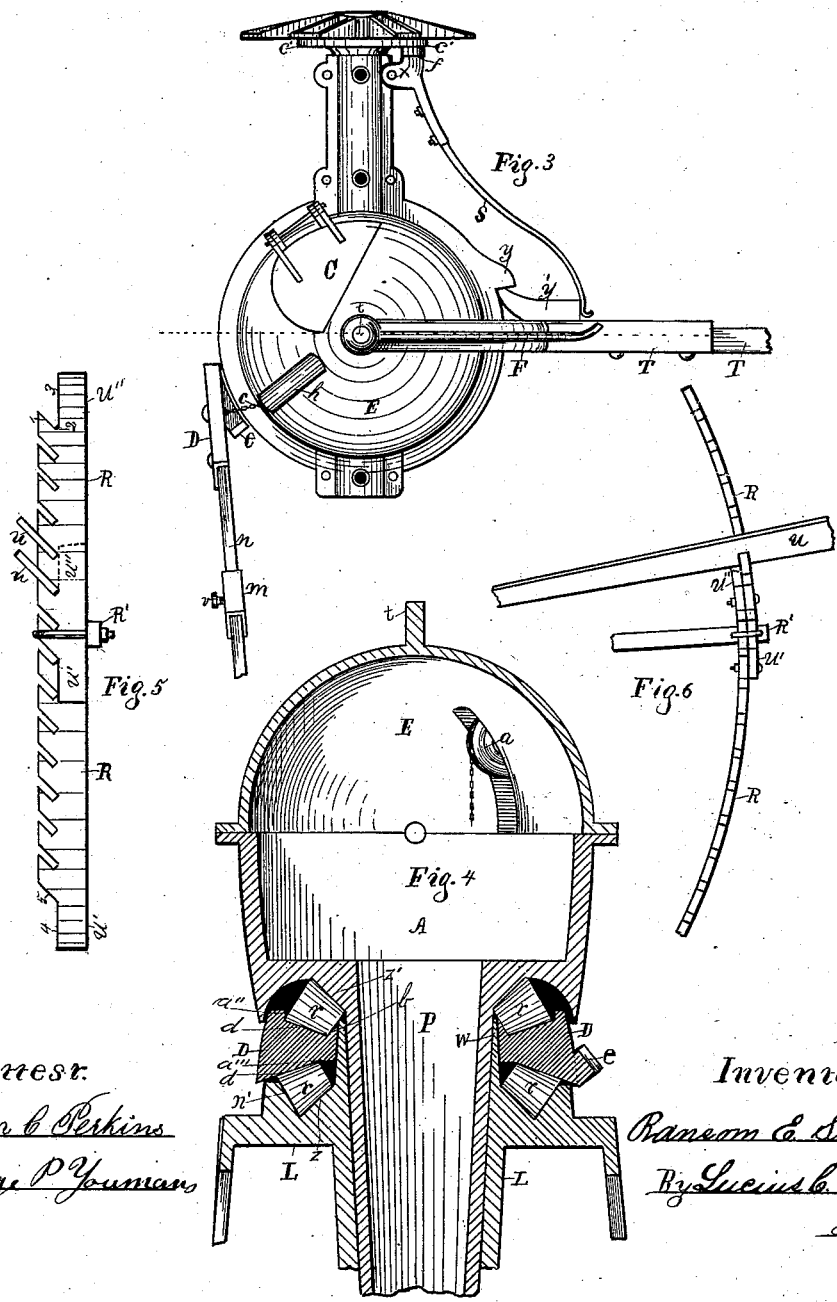

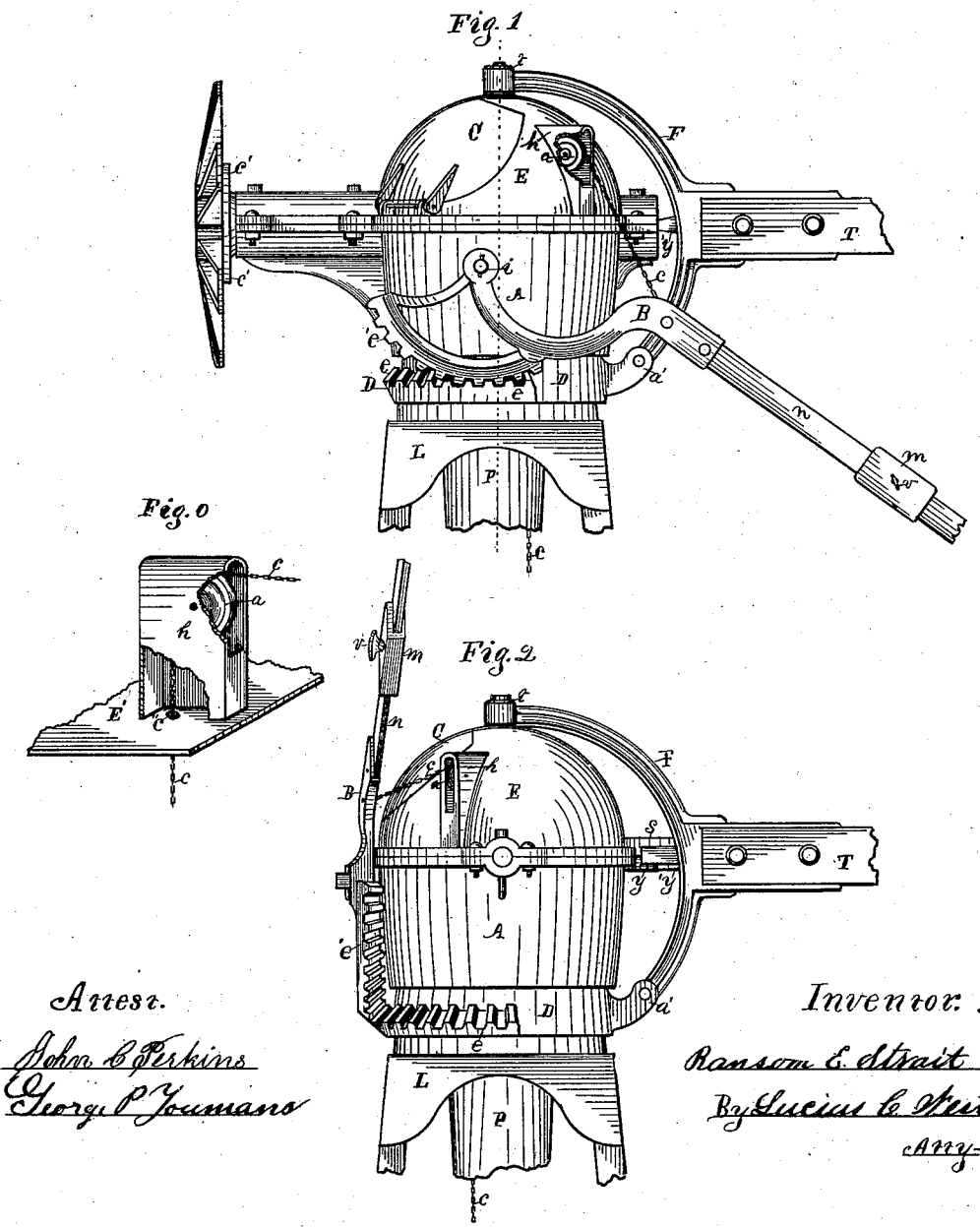

UNITED STATES PATENT OFFICE.

RANSOM E. STRAIT, OF GALESBURG, MICHIGAN.

WIND-ENGINE.

SPECIFICATION forming part of Letters Patent No. 259,241, dated June 6, 1882.

Application filed January 14, 1882. (No model.)

*To all whom it may concern:*

Be it known that I, RANSOM E. STRAIT, a citizen of the United States, residing at Galesburg, county of Kalamazoo, State of Michigan, have invented a new and useful Wind-Engine, of which the following is a specification.

This invention has relation to wind-wheels; and it consists in the novel construction and arrangement of parts, as will be hereinafter fully described, and particularly pointed out in the claims.

Figure 1 of the drawings is a side elevation, showing the wheel in the wind. Fig. 2 is a side elevation, the wheel being out of the wind. Fig. 3 is a plan view, the wheel being out of the wind. Fig. 4 is a vertical sectional view. Figs. 5 and 6 are detail views of the wheel; and Fig. 0 is a modification of the chain-pulley and its casing.

The hollow urn E A, representing in this construction the head, with vertical tube P, and the support or cap L, Fig. 2, Sheet 1, resemble in general such parts in former constructions. Wind-engines have also been provided heretofore with friction-wheels between the cap and head. In my present device, however, I effect improvements in the peculiar form of those parts in contact with the wheels, in connection with an intermediate rim of peculiar construction. In Fig. 4 this circular rim D or intermediate support is shown in its position and relation to the cap L and head E A and wheels $r\ r$. Sufficient number of wheels $r\ r$ are used to make two full rows encircling tube P, one row above and one row below rim D. The tracks or ways $d\ d$ of rim D for wheels $r\ r$ are made on a miter, the angles converging toward the inner end.

$a''$, $a'''$, and $b$ are ribs or projections bounding the inclines $d\ d$ and keeping the wheels $r\ r$ in place. The ways $z\ z$ of the cap and head are also formed on an incline or oblique angles, converging as they approach tube P. The rim $n'$ of cap L retains the wheel in place on way $z$.

W is an upwardly-extending rim, integral with cap L, which keeps rim D from contingent contact with tube P. By this arrangement the head and rim D may revolve independently or in unison, and as each row of wheels $r\ r$ (which are made smaller at one end than at the other) in their vertical relation with each other, and the wheels of each row on opposite sides of tube P in their horizontal relation to each other, are located bracing to each other, Fig. 2, the head E A and rim D cannot become canted over by the force of the wind or the weight of the wheel or vane in their different positions during the operation, and any increase of weight on one side or the other will not cause the ways and wheels to become unevenly worn, as the bearings upon each other are equal throughout their length, whether the weight upon all the wheels is the same at a given time or not. Rim D is provided with gearing $e$, meshing with gearing $e'$ of weight-arm B, Figs. 1, 2. Arm B has a pivotal connection with the head of the engine at $i$. Rim D is also constructed with a recessed support, $a'$, with which the lower branch of the curved vane-arm F is connected. The upper branch of arm, F, has a pivotal connection with stud $t$ at the top of the head. By this arrangement the rim assists in supporting the weight of the vane and head, causing one row of wheels to assist the other. By pulling on chain $c$, and thereby raising arm B, the head will be revolved, while the vane T will remain stationary, in throwing the wheel out of the wind, Figs. 2, 3. When the wind changes from one point of the compass to another the rim bearing the head and connecting parts will be revolved on the wheels of cap L until the wheel heads in the wind, as in Fig. 1. By means of my construction, when said change takes place the gear $e$, integral with rim D, is carried with it, thus always remaining in its proper relation with gear $e'$ of arm B. My peculiar construction and association of parts also imparts to the engine a very positive, quick, and easy action in regard to friction and its relation to the wind. The vane T has a block, $y'$, secured to it in proper location to engage shoulder $y$ of the head, thus limiting the distance the head can revolve when throwing the wheel out of the wind.

$s$ is a spring-bar, having casting $f$ pivoted at $x$, and adapted to engage friction-plate $c'$ of the wheel, thus serving as a brake. As the head is revolved the end of spring $s$ engages the side of block $y'$, moving along on it until it is forced over the end, as in Fig. 3, thus stopping the wheel and holding it at rest.

$h$ is a recessed covered and inclosed extension, adapted for containing the chain-wheel $a$ in a manner to entirely shield it and the chain after leaving it from snow, rain, and ice. This wheel-support is usually extended abruptly above (head E A in my construction) some support for it, (represented at E' in Fig. 0,) said support being provided with chain-hole $c''$, which serves as a guide in some devices to fix the location of the vertical portion of the chain, keeping it from contingent contact with the crank and other mechanism. Heretofore the chain-wheel, chain, and chain-hole have been so exposed to snow, rain, and ice that all parts have either frozen together or the accumulation of ice has prevented the chain from moving in the chain-hole. By my improved construction these specified parts are all shielded.

C is a door to the urn.

In prior constructions of wheel-rims in sections R R, Figs. 5 and 6, the sections have been so made that when connected there were no slots near arm R' to receive a slat, $u$, of the wheel in a manner to be securely fastened therein. To obviate this I form the section with end $u'$, having angles 4 5, and with end $u''$, having angles 1 2 3. Thus when end $u'$ of one section is lapped with end $u''$ of another section, Figs. 5 and 6, a complete circular rim may be formed having a complete and regular succession of slots, in which the slats $u$ may be securely fastened with nails driven obliquely from one division between the slots through the slat into the next division.

What I claim as new, and desire to secure by Letters Patent, is—

1. In a wind-engine, the cap L, having the rim $n'$, the inclined way $z$, and the upwardly-extending rim W, and the head E A, having tube P and inclined ways $z'$, in combination with the intermediate rim, D, and the conical friction-wheels $r\ r$ above and below its faces, substantially as specified.

2. In a wind-engine, the combination, with the cap L, having way $z$, rim D, and conical friction-wheels $r$, of the head E A, carrying the wind-wheel, the inclosed chain-wheel and chain, and the pivoted weighted lever B, geared to the rim D, substantially as specified.

3. In a wind-engine, the combination, with the head E A, provided with projection $y$ and adapted to revolve independently of the rim D, of the wheel-hub provided with the friction-plate $c'$, the spring $s$, having casting $f$, pivoted at $x$, and the vane T, provided with the block $y'$, substantially as specified.

4. In a wind-engine, the wind-wheel rim, formed from the recessed section $u'$, having angle 4 and 5, and the recessed section $u''$, having angle 1, 2, and 3, in combination with the slats $u$, substantially as specified.

RANSOM E. STRAIT.

Witnesses:
GEORGE P. YAUMANS,
I. L. WEST.